United States Patent [19]
Woldemar et al.

[11] Patent Number: 5,982,580
[45] Date of Patent: Nov. 9, 1999

[54] ACOUSTIC NOISE CONTROL IN A DISC DRIVE

[75] Inventors: Christopher Michael Woldemar, Santa Cruz; Enoch Mylabathula, San Jose, both of Calif.

[73] Assignee: Seagate Technology, Inc., Scotts Valley, Calif.

[21] Appl. No.: 08/887,973

[22] Filed: Jul. 3, 1997

Related U.S. Application Data

[62] Division of application No. 08/503,808, Jul. 18, 1995, abandoned.

[51] Int. Cl.$^6$ .................................................... G11B 33/14
[52] U.S. Cl. ...................................... 360/97.02; 360/97.01
[58] Field of Search ........................... 360/97.01, 97.02, 360/97.03, 97.04; 369/263

[56] References Cited

U.S. PATENT DOCUMENTS

| | | | |
|---|---|---|---|
| 4,760,478 | 7/1988 | Pal et al. ................................. | 360/104 |
| 5,214,549 | 5/1993 | Baker et al. .......................... | 360/97.02 |
| 5,282,099 | 1/1994 | Kawagoe et al. ................. | 360/97.02 X |
| 5,282,100 | 1/1994 | Tacklind et al. ..................... | 360/97.02 |
| 5,282,101 | 1/1994 | Reinisch ............................... | 360/97.03 |
| 5,483,397 | 1/1996 | Gifford et al. ........................ | 360/97.01 |
| 5,551,145 | 9/1996 | Jurgenson ............................. | 29/603.03 |
| 5,650,895 | 7/1997 | Koizumi et al. .................. | 360/97.03 X |

*Primary Examiner*—Andrew L. Sniezek
*Attorney, Agent, or Firm*—Flehr Hohbach Test Albritton & Herbert L.L.P.

[57] ABSTRACT

A noise damping system for a disc drive wherein the cover of the disc drive can be made or stamped out of a stainless steel constrained layer of viscoelastic damping material. The material of the cover consists of two layers of stainless steel with a thin layer of damping material sandwiched between. A foam material between the base section of the housing and the printed circuit board located below the housing avoid transmission of vibrations which would in turn generate noise.

6 Claims, 3 Drawing Sheets

ACOUSTIC NOISE CONTROL IN A DISC DRIVE

This is a divisional of application Ser. No. 08/503,808 filed Jul. 18, 1995 abn.

FIELD OF THE INVENTION

The invention is generally directed to the field of disc drives and more particularly to means for controlling acoustic noise emissions.

BACKGROUND OF THE INVENTION

Disc drive machines record and reproduce information stored on magnetic media. Conventional Winchester-type disc drives include a plurality of vertically aligned rotating information storage discs journaled about a spindle motor assembly within a housing. Magnetic discs which are of the type used as such storage media typically each have at least one associated head that is adapted to transfer information between the disc and an external system. Each head is carried by an elongated flexure arm. The flexure arms are vertically aligned and are each attached to a common head positioner assembly. The head positioning assembly is adapted to move the heads back and forth in unison across the face of the vertically aligned discs. The head positioner assembly may be either rotationally actuated along an arc, or take the form of a linear carriage that is free to move back and forth along a single axis, although the rotational actuator is the approach more commonly employed in today's disc drive designs.

In either case, the head positioner assembly is adapted to rapidly and precisely position the heads relative to the magnetic discs. Rapid movement of the various components, including the rotating spindle motor, the head positioner assembly, and the discs themselves tends to generate a wide variety of undesirable acoustic vibrations within the disc drive.

A primary source of acoustical emissions from a disc drive is the amplification of these vibrations and especially of the spindle motor vibration by the top cover and the base of the disc drive. One method of reducing the amplification of the cover is to add damping directly to the cover. Past tests have considered applying a constrain damping layer material to an existing cover. This approach was not successful unless the material was a lead sheet, which is environmentally toxic and expensive.

Therefore other approaches must be considered which are more effective in damping out the vibrations which are amplified and broadcast by the loudspeaker.

Further efforts to reduce noise emissions from the disc drive must be focused on reducing the amplification caused by vibration of the printed circuit board which is suspended below the base of the typical disc drive. This printed circuit board (PCB) being highly flexible, is a significant source of amplification of spindle motor noise. It is unacceptable to continue to have such significant noise emissions from commercial products which are used in computers which have few other noise sources, making the noise emissions from the disc drive irritating and undesirable.

SUMMARY OF THE INVENTION

Accordingly, it is a primary objective of the present invention to modify the design of a disc drive to damp emissions from the top cover, as well as the bottom cover and associated printed circuit board of the disc drive.

A further objective of the invention is to provide a successfully modified top cover which can be easily assembled and incorporated into a disc drive without additional expense from materials and manufacturing steps.

Another related objective of the present invention is to provide method and apparatus for reducing the emissions created by the printed circuit board suspended below the bottom surface of a disc drive.

To achieve these and other objectives, the cover of the disc drive can be made or stamped out of a stainless steel constrained layer of viscoelastic damping material. In a preferred embodiment, the material of the cover would consist of two layers of stainless steel with a thin layer of damping material sandwiched between. A further improvement to the noise emission characteristics of a disc drive would provide a foam material between the base section of the housing and the printed circuit board located below the housing to avoid transmission of vibrations which would in turn generate noise.

BRIEF DESCRIPTION OF THE DRAWINGS

The invention, together with further benefits and advantages thereof, may best be understood by referring to the following description taken in conjunction with the accompanying drawings.

DETAILED DESCRIPTION OF THE PREFERRED EMBODIMENT

Figure 1A:
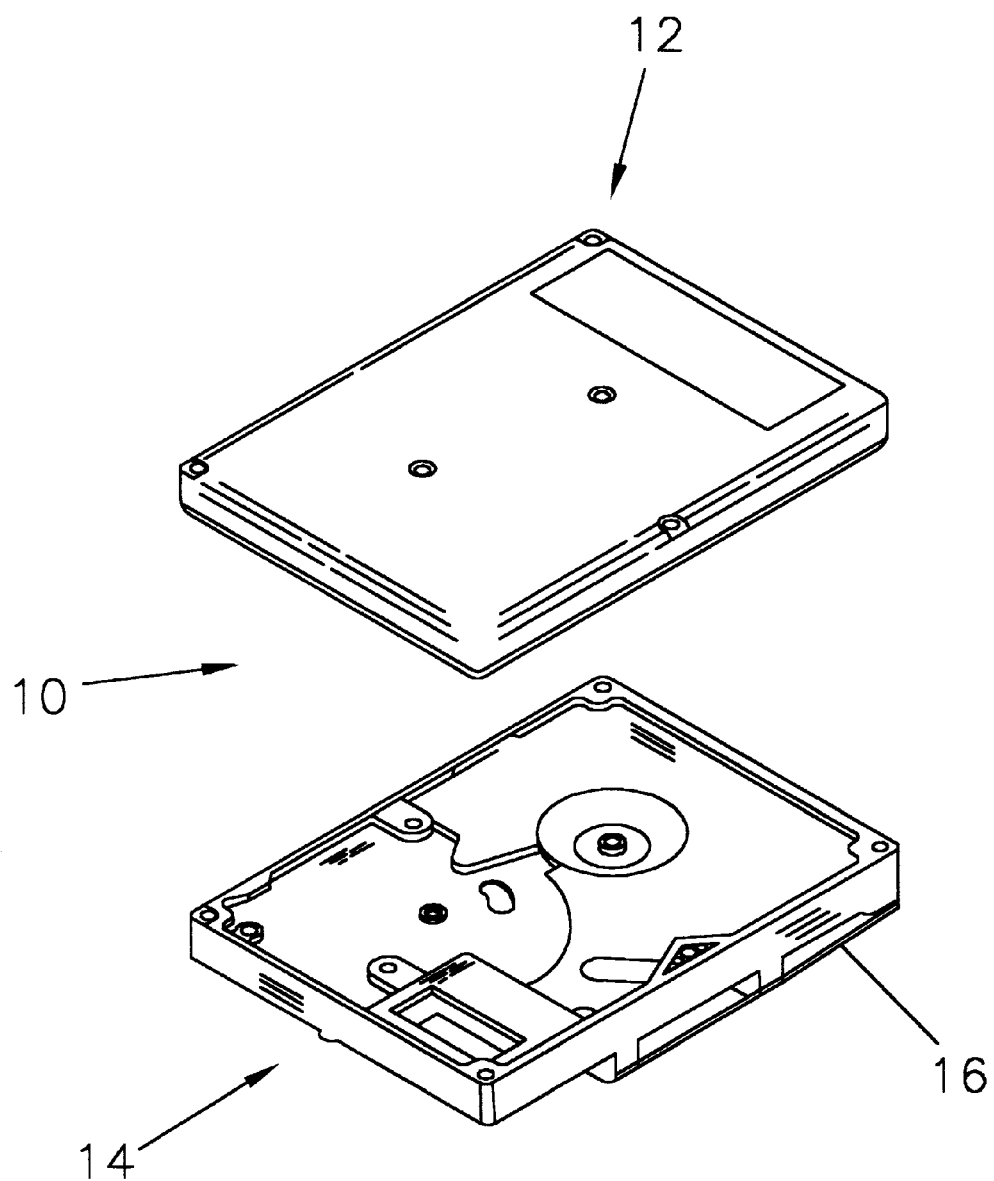
FIG. 1A is an exploded perspective view of the two pieces which form the housing of a typical disc drive.
Figure 1B:
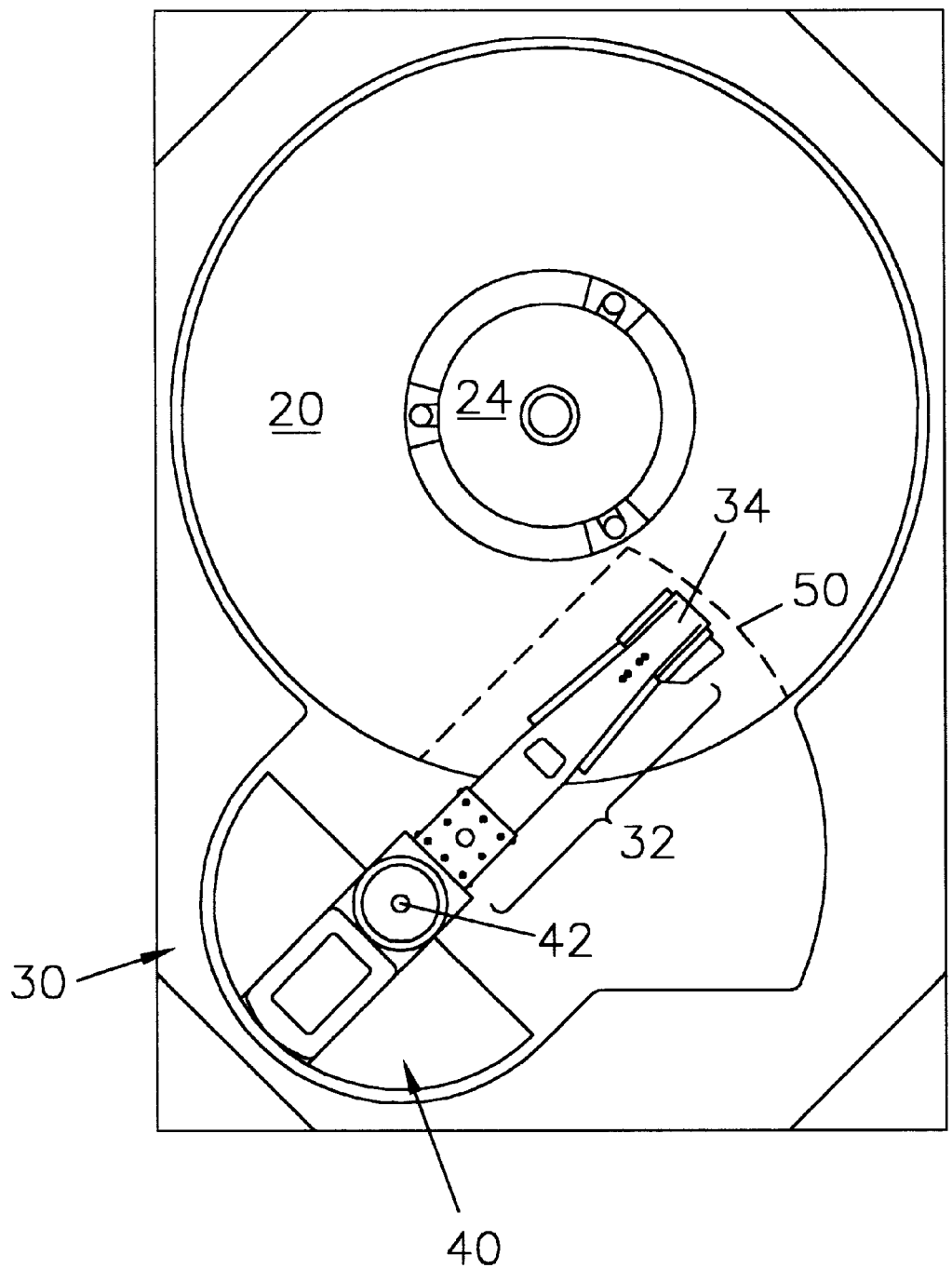
FIG. 1B is a top view of generic portions of a disk drive system incorporating teachings of the present invention.

Referring to FIGS. 1a and 1b, a disc drive constructed in accordance with the present invention includes a housing 10 having an upper casing member 12 and a lower casing member 14. A printed circuit board 16 is shown suspended from the lower surface of the lower casing of the housing.

Some of the generic portions of a disc drive system which is suitable for incorporating the teachings of the present invention and which constitute the primary sources of vibration which necessitated the present invention are shown in FIG. 1b. A plurality of information carrying magnetic discs are journaled about a spindle motor assembly 24 mounted within the housing comprising the upper and lower casing members. Each magnetic disc 20 has a multiplicity of concentric information stored tracks for recording information. A head positioner assembly 30 is mounted for high speed rotational movement in one corner of the housing. The positioner assembly 30 includes one or more flexure arms 32 each carrying a transducer 34 for reading information from and writing information onto the magnetic discs. A voice coil motor 40 is mounted on the opposite side of a pivot 42 from the flexure arms 32 and responds to electrical signals to rotate the head positioning assembly back and forth within the region generally defined by the dotted and solid line 50 such that the heads move in unison across the information storage discs to access the information thereon. It is the rotation of the spindle motor 24 at a constant speed carrying one or more of the discs, as well as the high speed movement of the actuator arms 30 which are the sources of vibrations which much be damped out to prevent their transmission as noise outside the disc drive.

Figure 2:
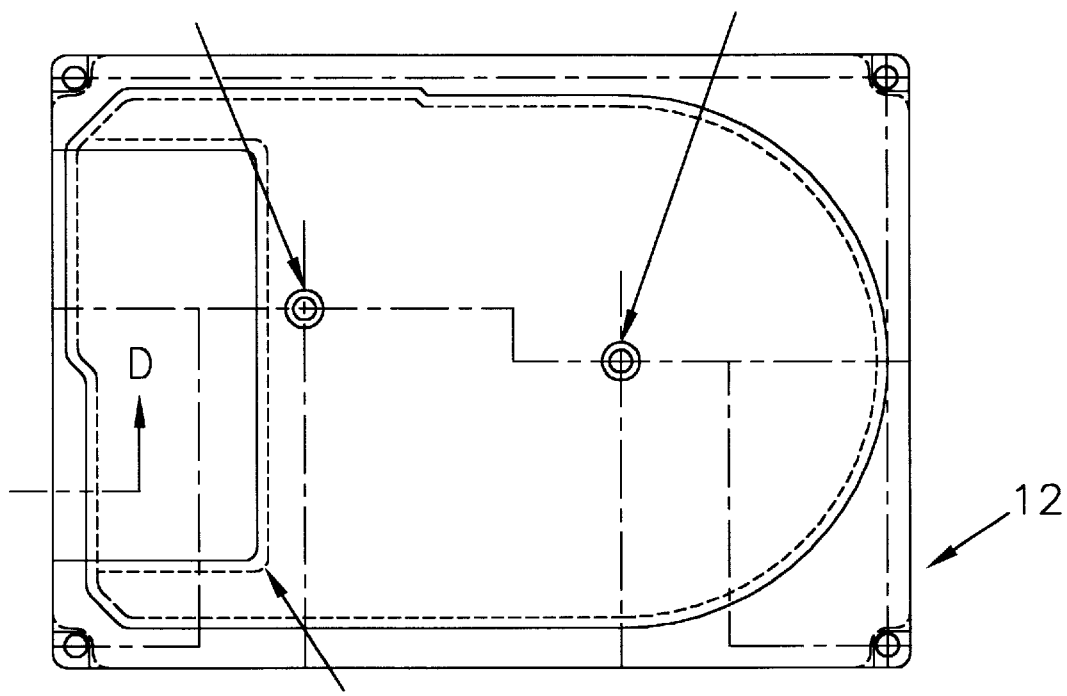
FIG. 2 is a top plan view of a top cover portion of a disc drive shown in FIG. 1.

Referring next to FIG. 2, one of the primary sources of acoustical emissions from a disc drive is the amplification of internally generated vibrations, especially from the spindle motor, by the top cover 12. Since the phenomena is analogous to a loudspeaker, where the top cover acts like a speaker cone for internally generated vibrations, past efforts have focused on applying a constraining layer of damping material to an existing cover. However, prior efforts were not successful unless the material was extremely dense.

According to the present invention, an alternative approach comprises stamping the cover out of a stainless steel constrained layer viscoelastic damping material. The material would consist of two layers of stainless steel with a thin layer of damping material sandwiched in between. Typical sample materials, obtainable from 3M Corporation, can be characterized as follows:

TABLE 1

| | Layer #1 | Layer #2 | Layer #3 |
|---|---|---|---|
| Sample #1 | 0.010 in 304 SS | 0.002 in Viscoelastic | 0.010 to 304 SS |
| Sample #2 | 0.015 in 304 SS | 0.002 in Viscoelastic | 0.005 in 304 SS |

In order to evaluate the effectiveness of this approach, four 2½ inch disc drives (type ST-9144A) were characterized for sound pressure and sound power. The covers were swapped to test with the two samples outlined above. The results were as outlined as at Table 2.

TABLE 2

Sound Pressure Test Data (Microphone @ 1 meter - dBA Reading)

| | Idle Mode: | | | Seeking Mode: | | |
|---|---|---|---|---|---|---|
| S/N: | STD Cover | Sample #1 | Sample #2 | STD Cover | Sample #1 | Sample #2 |
| 1618 | 28.5 | 24.7 | 24.0 | 32.1 | 28.6 | 28.1 |
| 3346 | 22.6 | 19.7 | 19.3 | 30.2 | 23.8 | 24.4 |
| 1BG7 | 26.6 | 23.2 | 23.3 | 31.1 | 29.6 | 29.1 |
| 2291 | 23.8 | 21.7 | 21.9 | 31.6 | 30.2 | 29.2 |
| AVG: | 25.4 | 22.3 | 22.1 | 31.3 | 28.1 | 27.7 |
| DELTA: | | −3.1 | −3.3 | | −3.2 | −3.6 |

Figure 3:
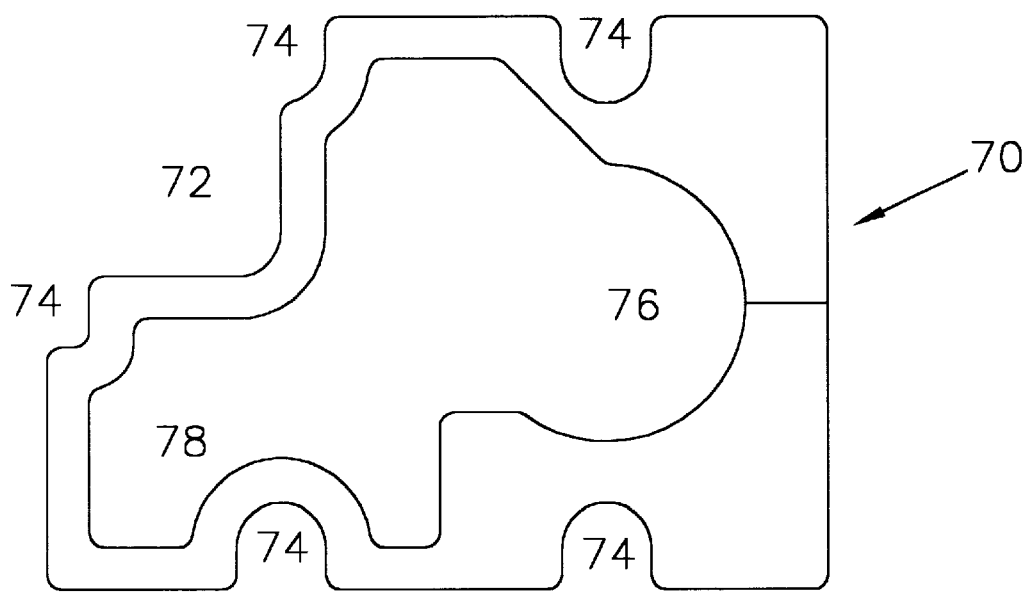
FIG. 3 is a plan view of a gasket to be inserted between a printed circuit board and the bottom portion of the housing in a disc drive.

A further additional effort to reduce noise emission from a disc drive product incorporates a foam material such as shown at 70 in FIG. 3 is placed between the printed circuit board 16 (FIG. 1) and the base portion 14 of the head disc assembly. This reduces the printed circuit board amplification of spindle motor noise, and actuator noise.

A preferred form of the foam selected for the test described below was a two pound, 0.1875 inch thick open cell polyurethane foam. The foam is selected and formulated for its high damping characteristics, as well as being very thin so that it does not increase the overall height of the drive, easy application and handling, and resistance to temperature. However, the most important characteristic is its spring rate, that is that it flexes with sound generation to absorb the sound which would otherwise be amplified by the printed circuit board.

The foam is preferably in a roughly perimeter shape as shown in FIG. 3, outlining roughly the perimeter of the printed circuit board. As shown by the shape 70 in FIG. 3, a region 72 is left vacant where the voice coil motor is located, as an allowance of space for the magnets and the like which make up the voice coil motor. The insets 74 appearing around the perimeter of the foam are required to allow for the mounting feet. The open area 76 allows for the placement of the base mount of the spindle motor 24 which rotates the discs. The region 78 is left open in case it is necessary to bring out the electrical connections from the head disc assembly directly to the printed circuit board underneath.

In a preferred embodiment, the semiperimeter foam is compressed between the circuit board 16 and the base portion 14 of the housing achieving 25% to 30% compression of the foam which thereby presses the foam against the board and damps the circuit board.

The printed circuit board is typically 90 to 200 thousandths of an inch from the base. This creates an air gap where the air moves, creating noise as the board vibrates with physical motion within the drive. The placement of the foam both fills the air gap, and dampens the residual board vibrations during vibration. This will also prevent nuisance tripping of the shock sensor which is incorporated into many disc drives used in portable applications and which may be tripped by excessive vibration of the printed circuit board.

It has been found by testing that compression of the foam is critical to successful adaptation of the invention as the foam must contact the board. Other approaches have been taken in the past, but these affected the thermal stability and stress of the system in a negative fashion.

In order to analyze the success of this approach, four 2½ inch disc drives (ST9144A) were characterized for sound pressure and sound power. The constrained layer cover and perimeter foam were tested separately (mod 1, and mod 2) and then together (mod 1 and mod 2) to see the accumulated effects. The drives were then returned to their original condition and retested. The results are set forth in Table 3.

TABLE 3

Sound Pressure Test Data (Microphone @ 1 meter - dBA)

| S/N: | Idle Mode: | | | | | Seeking Mode (Rndm Seek w/20 Msec dly) | | | | |
|---|---|---|---|---|---|---|---|---|---|---|
| | STD: | Mod #1 | Mod #2 | # 1 & 2 | STD: | STD: | Mod #1 | Mod #2 | # 1 & 2 | STD: |
| 1618 | 28.5 | 24.0 | 24.2 | 20.2 | 28.1 | 32.1 | 28.1 | 28.8 | 23.5 | 32.0 |
| 3346 | 22.6 | 19.3 | 20.7 | 17.8 | 23.2 | 30.2 | 24.4 | 29.7 | 23.4 | 31.4 |
| 1BG7 | 26.6 | 23.3 | 25.4 | 22.1 | 29.1 | 31.1 | 29.1 | 29.6 | 24.7 | 32.2 |
| 2291 | 23.8 | 21.9 | 21.5 | 18.7 | 24.6 | 31.6 | 29.2 | 27.8 | 22.0 | 30.3 |
| AVG: | 25.4 | 22.1 | 23.0 | 19.7 | 26.3 | 31.3 | 27.7 | 29.0 | 23.4 | 31.5 |

Sound Power Test Data (Hemisphere test surface w/13 microphones - Bels)

| S/N:4 | Idle Mode: | | | | | Seeking Mode (Rndm Seek w/20 Msec dly) | | | | |
|---|---|---|---|---|---|---|---|---|---|---|
| | STD: | Mod #1 | Mod #2 | #1 & 2 | STD: | STD: | Mod #1 | Mod #2 | # 1 & 2 | STD: |
| 1618 | 4.06 | 3.85 | 3.86 | 3.63 | 4.07 | 4.42 | 4.21 | 4.22 | 4.09 | 4.37 |
| 3346 | 3.40 | 3.27 | 3.38 | 3.23 | 3.41 | 4.03 | 3.81 | 4.23 | 3.92 | 4.18 |
| 1BG7 | 3.96 | 3.78 | 3.86 | 3.65 | 4.01 | 4.42 | 4.33 | 4.37 | 4.17 | 4.47 |
| 2291 | 3.68 | 3.52 | 3.50 | 3.36 | 3.67 | 4.31 | 4.12 | 4.12 | 3.94 | 4.27 |
| AVG: | 3.78 | 3.61 | 3.65 | 3.47 | 3.79 | 4.30 | 4.12 | 4.24 | 4.03 | 4.32 |

Mod #1 = Constrained Layer Cover (0.015 in SS - 0.002 in ISO112 - 0.005 in SS)
Mod #2 = 0.125 in thick perimeter foam between PCB and HDA The acoustical data indicates the constrained layer cover offers significant reduction in emissions for both idle and seek modes (greater than 3.0 dBA sound pressure and 1.3 to 1.8b Bels sound power). This cover material has proven to be excellent for use for customers or applications that are sensitive to acoustics. Furthermore, the perimeter foam offers an additional 2.5 dBA reduction for sound pressure, and 1.3 dBA reduction in sound power. Therefore, the combined effect of these modifications could be up to 5 dBA sound pressure and 3 DBA sound power.

Other alterations of the present invention may be adopted by people of skill in this field who have studied the present disclosure. Therefore, the scope of the present invention is to be limited only by the following claims.

We claim:

1. In a disc drive system having recording media within a sealed housing having top and bottom casing members, a read write head for transferring information between said recording media and an external system and a head positioner assembly for locating said head relative to said recording media and a printed circuit board supported below the bottom casing member of said disc drive, the improvement comprising a semi-perimeter foam gasket located in an air space between said printed circuit board and said bottom casing member and in contact with the board and compressed therebetween to between 25 and 30% of its free-standing height to dampen vibrations of said printed circuit board and said foam gasket comprising a thick open cell polyurethane foam selected for its high damping characteristics thereby reduce noise on said disc drive.

2. A disc drive system having a recording media within a sealed housing having top and bottom casing members, a read/write head for transferring information between said recording media and an external system, and a head positioner assembly for locating said head relative to said recording media, said disc drive further comprising a printed circuit board supported below said bottom casing member of said housing, and further comprising a foam layer located between a bottom surface of said bottom casing member and a top surface of said printed circuit board and in contact with said board surface in an air space therebetween to damp out vibrations generated by said printed circuit board and then thereby reduce noise emissions from said disc drive, said foam layer comprising a material compressed to between 25 and 30% of its free-standing height.

3. A disc drive as claimed in claim 2, said foam layer having a perimeter shape roughly outlining a perimeter of the printed circuit board.

4. A disc drive as claimed in claim 3 wherein said foam layer perimeter excludes a region where a voice coil motor included in said head positioner assembly is located in said bottom casing assembly.

5. A disc drive as claimed in claim 4 wherein said foam layer includes a cut-out region on the said perimeter for a base mount of a spindle motor mounting and rotating said recording media.

6. In a disc drive system having recording media within a sealed housing having top and bottom casing members, a read write head for transferring information between said recording media and an external system and a head positioner assembly for locating said head relative to said recording media and a printed circuit board supported below the bottom casing member of said disc drive, the improvement comprising compressible means located in an air space between said printed circuit board and said bottom casing member and compressed therebetween to between 25 and 30% of its free-standing height to dampen vibrations of said printed circuit board and thereby reduce noise on said disc drive.

* * * * *